(12) United States Patent
Nagasaka

(10) Patent No.: US 10,127,164 B2
(45) Date of Patent: Nov. 13, 2018

(54) PROCESSING DEVICE, PROCESSING METHOD, STORAGE MEDIUM, AND ELECTRONIC MUSICAL INSTRUMENT

(71) Applicant: CASIO COMPUTER CO., LTD., Tokyo (JP)

(72) Inventor: Hiroaki Nagasaka, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 225 days.

(21) Appl. No.: 14/872,882

(22) Filed: Oct. 1, 2015

(65) Prior Publication Data

US 2016/0132438 A1 May 12, 2016

(30) Foreign Application Priority Data

Nov. 7, 2014 (JP) ................................ 2014-226577

(51) Int. Cl.
*G06F 13/36* (2006.01)
*G06F 13/16* (2006.01)
*G06F 11/30* (2006.01)

(52) U.S. Cl.
CPC ...... *G06F 13/1663* (2013.01); *G06F 11/3051* (2013.01)

(58) Field of Classification Search
None
See application file for complete search history.

(56) References Cited

U.S. PATENT DOCUMENTS

| 5,774,131 A | * | 6/1998 | Kim | G06F 3/162 345/503 |
| 6,223,244 B1 | * | 4/2001 | Downer | G06F 13/36 710/111 |
| 8,826,353 B2 | * | 9/2014 | Takahashi | H04N 7/181 348/211.1 |
| 2009/0157934 A1 | * | 6/2009 | Kato | G06F 13/364 710/241 |
| 2013/0233153 A1 | | 9/2013 | Nagasaka | |
| 2014/0007754 A1 | | 1/2014 | Nagasaka | |

FOREIGN PATENT DOCUMENTS

| JP | H7-271376 A | | 10/1995 |
| JP | 08030549 A | * | 2/1996 |
| JP | H10-177388 A | | 6/1998 |
| JP | 2011-85989 A | | 4/2011 |
| JP | 2013-186368 A | | 9/2013 |
| JP | 2014-16378 A | | 1/2014 |

OTHER PUBLICATIONS

Japanese Office Action dated Aug. 31, 2018, in a counterpart Japanese patent application 2014-226577. (A machine translation (not reviewed for accuracy) attached.).

* cited by examiner

*Primary Examiner* — Ilwoo Park
(74) *Attorney, Agent, or Firm* — Chen Yoshimura LLP

(57) ABSTRACT

A processing device includes: a plurality of processing units that perform processes in accordance with data items read from a memory; a bus that connects the memory to the plurality of processing units; and a traffic monitor that monitors traffic on the bus with respect to the plurality of processing units, and when the traffic for one of the processing units that has been assigned access rights to the memory exceeds or reaches a prescribed upper limit, outputs a signal to the one of the processing units so as to reduce or suspend the traffic for the one of the processing units.

17 Claims, 11 Drawing Sheets

PROCESSING DEVICE, PROCESSING METHOD, STORAGE MEDIUM, AND ELECTRONIC MUSICAL INSTRUMENT

BACKGROUND OF THE INVENTION

Field of the Invention

The present invention relates to a processing device configured such that a plurality of processing units such as a CPU, a sound source, and the like can share a memory; a processing method; a storage medium; and an electronic musical instrument.

In general, electronic musical instruments include a musical sound playing device constituted by a CPU that controls the entire musical instrument, and a sound source that generates a musical sound waveform under control of the CPU. To respond to the demand to reduce product costs, one particular configuration in recent years has a memory that reads waveform data items required by the sound source, and this memory is shared with the CPU, which controls the various units constituting the instrument.

In such a musical sound playing device in which the sound source and CPU share a memory, a plurality of processes access the shared memory simultaneously, which can result in competition (conflict) among the processes to access the memory. In order to avoid such competition for access, access to the shared memory can be put on standby, but the more channels there are that simultaneously emit sound in the sound source, the more marked process delays resulting from access standby are, which results in a decrease in processing efficiency.

In recent years, the following techniques have been developed: improving processing efficiency by, in accordance with the open status of the bus, using a period other than the time slot when each channel is playing sound in order to read waveform data items of a prescribed number of channels from the shared memory, as disclosed in Japanese Patent Application Laid-Open Publication No. 2013-186368; and a technique that, while the waveform data items of a prescribed number of channels is read from the memory in accordance with the open status of the bus, stops the playing of channels for which reading of waveform data items is not completed prior to a failure determination timing, thereby lowering the bus load while preventing unwanted noise, as disclosed in Japanese Patent Application Laid-Open Publication No. 2014-16378.

However, with the techniques disclosed in the publications above, it is possible only to improve efficiency for processes pertaining to generation of musical sound waveforms executed in the sound source and prevent unwanted noise, and thus, there is a risk of a reduction in processing performance for controlling the entire system (entire musical instrument).

Specifically, if the sound source bus priority is higher than that of the CPU, for example, then the more channels there are that simultaneously play sound in the sound source, the more times the shared memory is accessed, while the number of times the CPU accesses the shared memory decreases, which results in a reduction in processing performance for controlling the entire system (entire musical instrument) including processes for controlling the sound source by the CPU.

SUMMARY OF THE INVENTION

Accordingly, the present invention is directed to a scheme that substantially obviates one or more of the above-discussed and other problems due to limitations and disadvantages of the related art. The present invention takes into account the situation mentioned above, and an object thereof is to provide a processing device by which it is possible to prevent a reduction in processing performance for controlling the entire system (entire musical instrument), a processing method, a storage medium, and an electronic musical instrument.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a processing device, including: a plurality of processing units that perform processes in accordance with data items read from a memory; a bus that connects the memory to the plurality of processing units; and a traffic monitor that monitors traffic on the bus with respect to the plurality of processing units, and when the traffic for one of the processing units that has been assigned access rights to the memory exceeds or reaches a prescribed upper limit, outputs a signal to the one of the processing units so as to reduce or suspend the traffic for the one of the processing units.

In another aspect, the present disclosure provides a processing method used by a processing device having a plurality of processing units that perform processes in accordance with data items read from a memory, and a bus connecting the memory to the plurality of processing units, the method including: monitoring traffic on the bus with respect to the plurality of processing units; and outputting, when the traffic for one of the processing units that has been assigned access rights to the memory exceeds or reaches a prescribed upper limit, a signal to the one of the processing units so as to reduce or suspend the traffic for the one of the processing units.

In another aspect, the present disclosure provides a non-transitory computer-readable storage medium storing therein instructions executable by a computer, the computer including a plurality of processing units that perform processes in accordance with data items read from a memory, and a bus connecting the memory to the plurality of processing units, the instructions causing the computer to execute the following: monitoring traffic on the bus with respect to the plurality of processing units; and outputting, when the traffic for one of the processing units that has been assigned access rights to the memory exceeds or reaches a prescribed upper limit, a signal to the one of the processing units so as to reduce or suspend the traffic for the one of the processing units.

It is to be understood that both the foregoing general description and the following detailed description are exemplary and explanatory, and are intended to provide further explanation of the invention as claimed.

DETAILED DESCRIPTION OF THE EMBODIMENTS

Embodiments of the present invention will be explained below with reference to the drawings.

A. Overall Configuration

Figure 1:
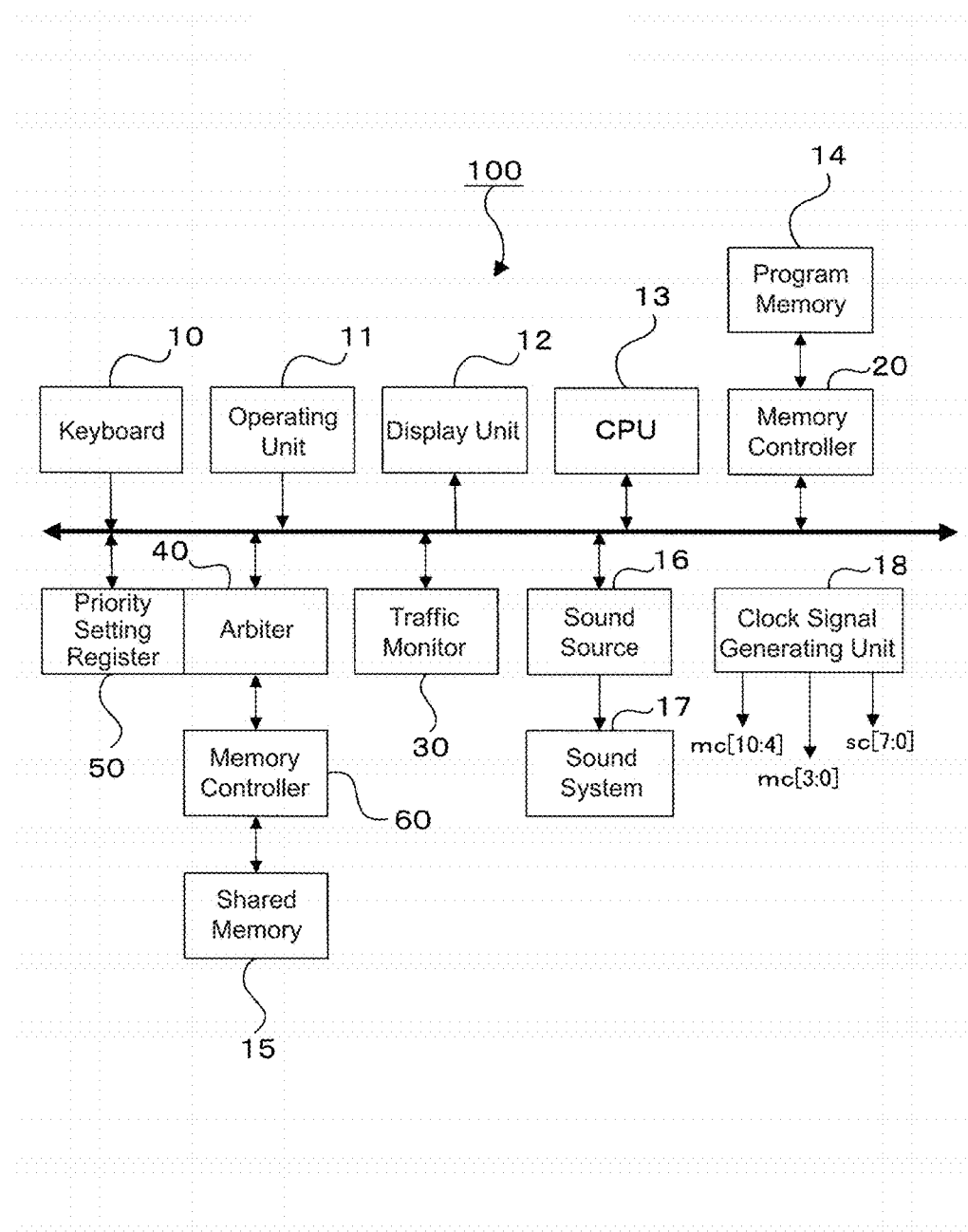
FIG. 1 is a block diagram showing an overall configuration of an electronic musical instrument 100 provided with a musical sound playing device according to an embodiment of the present invention.

An overall configuration of an electronic musical instrument 100 provided with a musical sound playing device according to an embodiment of the present invention will be described with reference to FIG. 1. FIG. 1 is a block diagram for showing the overall configuration of the electronic musical instrument 100. In FIG. 1, a keyboard 10 has a plurality of keys as operation units for designating the pitch of musical sound to be played, and outputs performance information including a key ON/key OFF signal that is based on performance operation (pressing/releasing of keys), and the number of the key that has been pressed (or the number of the key that has been released) in the pitch thus designated.

Although not shown, an operation unit 11 has, in addition to a power switch that turns ON/OFF the power, various types of switches for configuring and selecting various types of parameters that modify the generated musical sound. The operation unit 11 generates a switch event according to the type of switch operated. The switch event generated by the operation unit 11 is included in the CPU 13. A display unit 12 displays, in accordance with a display control signal from the CPU 13, a screen including configuration status and operation status of the respective units of the musical instrument.

The CPU 13 sets the operation status of the respective units of the device in accordance with the various types of switch events supplied from the operation unit 11. Additionally, the CPU 13 generates note ON events that include performance information generated by the user pressing a key and sends the note ON event to a sound source 16 to issue a command to emit a musical sound, and generates note OFF events including performance information generated by the user releasing a key to the sound source 16 to issue a command to turn OFF the sound. Characteristic process operations of the CPU 13 that relate to the gist of the present invention will be described in detail below.

A program memory 14 is constituted by ROM, for example, and stores various types of program data items to be loaded to the CPU 13. The shared memory 15, which is accessible by both the CPU 13 and the sound source 16, is constituted by RAM, for example, and stores program data/work data of the CPU 13, program data/work data/ waveform data of various tones of the sound source 16, or the like.

The sound source 16 is provided with a plurality of sound channels (MIDI channels) configured so as to read waveform data items from a memory in a well-known manner, and the sound source 16 generates musical sound waveform data items W in accordance with a note ON/note OFF event sent from the CPU 13, and additionally applies an effect to the generated musical sound waveform data items W and then outputs the result. A sound system 17 converts the musical sound waveform data items W outputted from the sound source 16 to an analog musical sound signal, filters to remove unwanted noise or the like from the musical sound signal, and then amplifies the musical sound signal and causes the result to be emitted from a speaker.

The keyboard 10, the operation unit 11, the display unit 12, the CPU 13, and the sound source 16 are connected to a direct bus 19. The program memory 14 is connected to the bus 19 through a memory controller 20, and the shared memory 15 is connected to the bus 19 through a memory controller 60 and an arbiter 40.

Additionally, the bus 19 has connected thereto the traffic monitor 30 and a priority setting register 50, and the traffic monitor 30 monitors traffic of the CPU 13 and the sound source 16 accessing the shared memory 15 through the memory controller 60 and the arbiter 40.

A clock signal generating unit 18 generates a reference clock signal CK and is provided with an 11-bit master counter mc and an 8-bit sampling counter sc that count the reference clock signal CK. The clock signal generating unit 18 generates a clock signal mc <10:4>, which is a higher order 7-bit output (10 SB(MSB)-4 SB) of the master counter mc, and a clock signal mc <3:0> and sampling clock signal sc <7:0>, which are lower order 7-bit outputs (3 SB-0 SB(LSB)).

Figure 2:
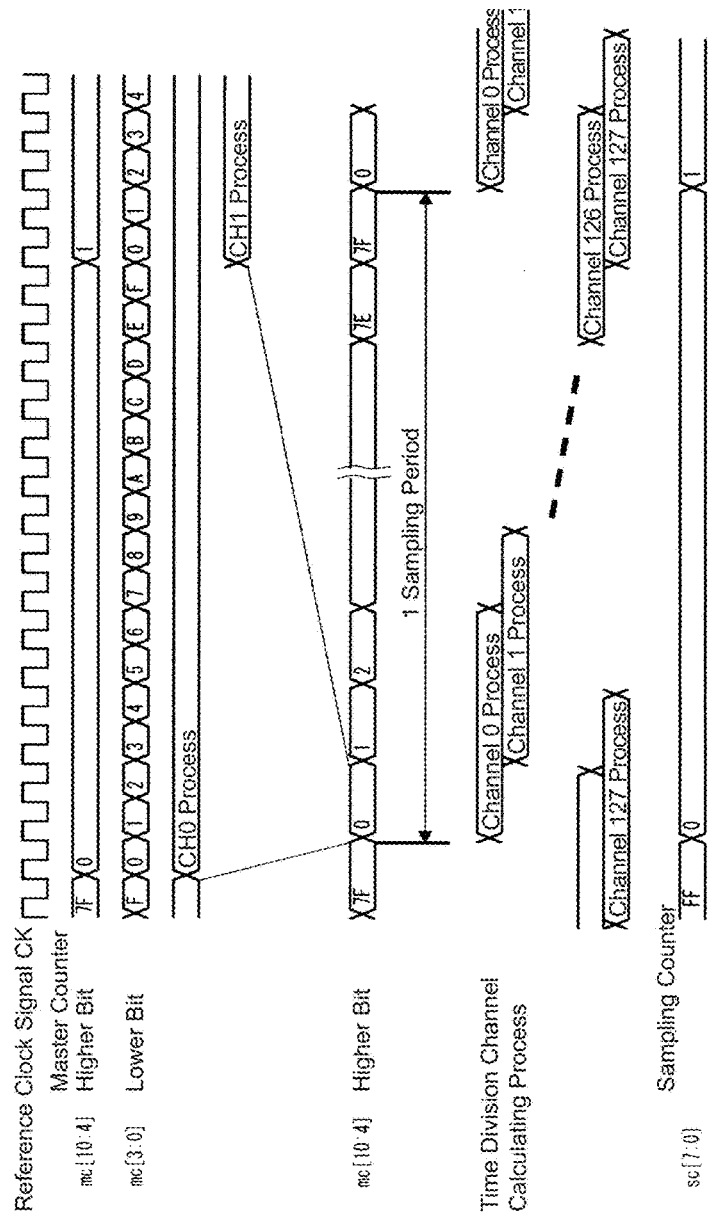
FIG. 2 is a time chart indicating the relation between a reference clock signal CK, a clock signal mc <10:4>, a clock signal mc <3:0>, and a sampling clock signal SC <7:0>.

Here, the relationship among the reference clock signal CK, the clock signal mc <10:4>, and the clock signal mc <3:0> will be described with reference to FIG. 2. In FIG. 2, the clock signal mc <10:4> generates a channel 0 process to channel 127 process corresponding to time slots respectively corresponding to 128 (0 h-7 Fh) sound emitting channels that undergo time division operation in the sound source 16.

The channel 0 process to channel 127 processes each has respectively allocated thereto a period of 16 clock pulses of the clock mc <3:0>×3. In the period equal to 16 clock pulses×3, a period equal to 16 clock pulses×1 is taken up by same channel processing, and the remaining period of 16 clock pulses×2 is allocated to a pipeline process with the subsequent channel. The sampling clock signal sc <7:0> starts every time a sampling time, in which the clock signal mc <10:4> completes one cycle, passes.

B. Configuration of Musical Sound Playing Device (1) Overall Configuration

Figure 3:
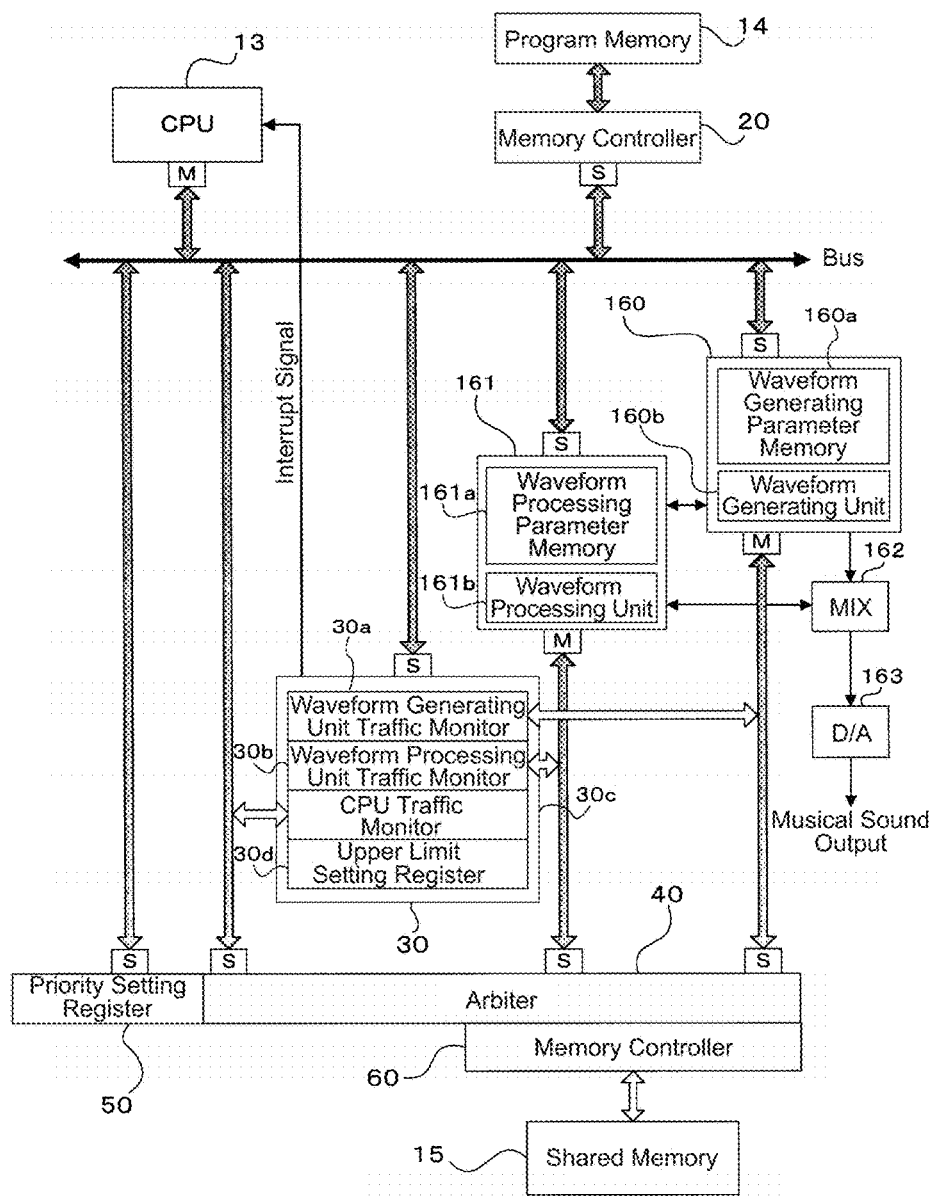
FIG. 3 is a block diagram showing a configuration of a musical sound playing device according to an embodiment of the present invention.

Next, the overall configuration of the musical sound playing device of the above embodiment will be described with reference to FIG. 3. FIG. 3 is a block diagram showing an overall configuration of the musical sound playing device. In this drawing, components in common with the respective parts shown in FIG. 1 are assigned the same reference characters, and descriptions thereof are omitted.

The musical sound playing device shown in FIG. 3 is constituted by the CPU 13, the program memory 14, the shared memory 15, the memory controller 20, the traffic monitor 30, the arbiter 40, the priority setting register 50, the memory controller 60, and the sound source 16 (waveform generating unit 160, waveform processing unit 161, mixer 162, and D/A converter 163). In FIG. 3, the "M" shown with the components indicates the bus master and the "S" indicates the bus slave.

The memory controller 20 reads program data items from the program memory 14 in accordance with a request from the CPU 13 operating as the bus master. The traffic monitor 30 is constituted by the waveform generating unit traffic monitor 30a, the waveform processing unit traffic monitor 30b, the CPU traffic monitor 30c, and the upper limit setting register 30d.

The waveform generating unit traffic monitor 30a monitors traffic on the bus (bus load) between the arbiter 40 and the waveform generating unit 160 (described later) forming a portion of the sound source 16. When the traffic being monitored (bus load) exceeds or reaches a set value (upper limit) recorded in the upper limit setting register 30d, the waveform generating unit traffic monitor 30a generates an interrupt signal and sends it to the CPU 13.

The waveform processing unit traffic monitor 30b monitors traffic on the bus (bus load) between the arbiter 40 and the waveform processing unit 161 (to be described later) forming a portion of the sound source 16. When the traffic being monitored (bus load) exceeds or reaches a set value (upper limit) recorded in the upper limit setting register 30d, the waveform processing unit traffic monitor 30b generates an interrupt signal and supplies it to the CPU 13.

The CPU traffic monitor 30c monitors traffic on the bus (bus load) between the CPU 13 and the arbiter 40. When the traffic being monitored (bus load) exceeds or reaches a set value (upper limit) recorded in the upper limit setting register 30d, the CPU traffic monitor 30c generates an interrupt signal and supplies it to the CPU 13.

The upper limit setting register 30d temporarily stores upper limit values of the bus load of the above-mentioned waveform generating unit 160, waveform processing unit 161, and CPU 13. These upper limits are written by the CPU 13. The basic configuration of the waveform generating unit traffic monitor 30a, the waveform processing unit traffic monitor 30b, and the CPU traffic monitor 30c will be described later.

The arbiter 40 arbitrates requests to use the corresponding bus to access the shared memory 15 from the CPU 13, which can be a bus master, the waveform generating unit 160, and the waveform processing unit 161 in accordance with an order of priority recorded in the priority setting register 50, and gives access rights to the shared memory 15 via the memory controller 60. The order of priority recorded in the priority setting register 50 is written by the CPU 13. As previously described, the shared memory 15 stores program data/work data of the CPU 13, program data/work data/ waveform data for various tones of the sound source 16, and the like.

The waveform generating unit 160, which can serve as the bus master of the arbiter 40, is constituted by a waveform generating parameter memory 160a and a waveform generating unit 160b. The waveform generating parameter memory 160a stores note ON/note OFF events supplied from the CPU 13, waveform data items read from the shared memory 15 accessed via the arbiter 40 and the memory controller 60, and the like. The waveform generating unit 160b generates musical sound waveform data items W in accordance with the note ON/note OFF events and waveform data items stored in the waveform generating parameter memory 160a.

The waveform processing unit 161, which can serve as the bus master of the arbiter 40, is constituted by a waveform processing parameter memory 161a and a waveform processing unit 161b. The waveform processing parameter memory 161a stores effect types issued from the CPU 13, effect parameters read from the shared memory 15 accessed via the arbiter 40 and the memory controller 60, and the like. The waveform processing unit 161b generates effect sounds (delay, reverb, chorus, etc.) that are based on the effect types and effect parameters stored in the waveform generating parameter memory 160a for the musical sound waveform data items W generated by the waveform generating unit 160.

The mixer 162 mixes the sound effects outputted from the waveform processing unit 161 with the musical sound waveform data items W outputted from the waveform generating unit 160. The D/A converter 163 converts the output from the mixer 162 to analog format musical sound output.

In the configuration above, the traffic (bus load) of the waveform generating unit 160, the waveform processing unit 161, and the CPU 13, which access the shared memory 15 via the arbiter 40 and the memory controller 60, is monitored, respectively, by the waveform generating unit traffic monitor 30a, the waveform processing unit traffic monitor 30b, and the CPU traffic monitor 30c.

The CPU 13 reviews the respective monitor results of the waveform generating unit traffic monitor 30a, the waveform processing unit traffic monitor 30b, and the CPU traffic monitor 30c, and controls the bus such that the amount of data items transmitted from the shared memory 15 to the waveform generating unit 160 and the waveform processing unit 161, respectively, does not exceed the maximum transmission rate. Specifically, to ensure the maximum transmission rate is not exceeded, the CPU 13 causes the playing pitch to be suppressed by changing the order of priority in the priority setting register 50 or by reducing the number of sound channels simultaneously outputting sound to the waveform generating unit 160 of the sound source 16.

(2) Configuration of Traffic Monitor 30

Figure 4A:
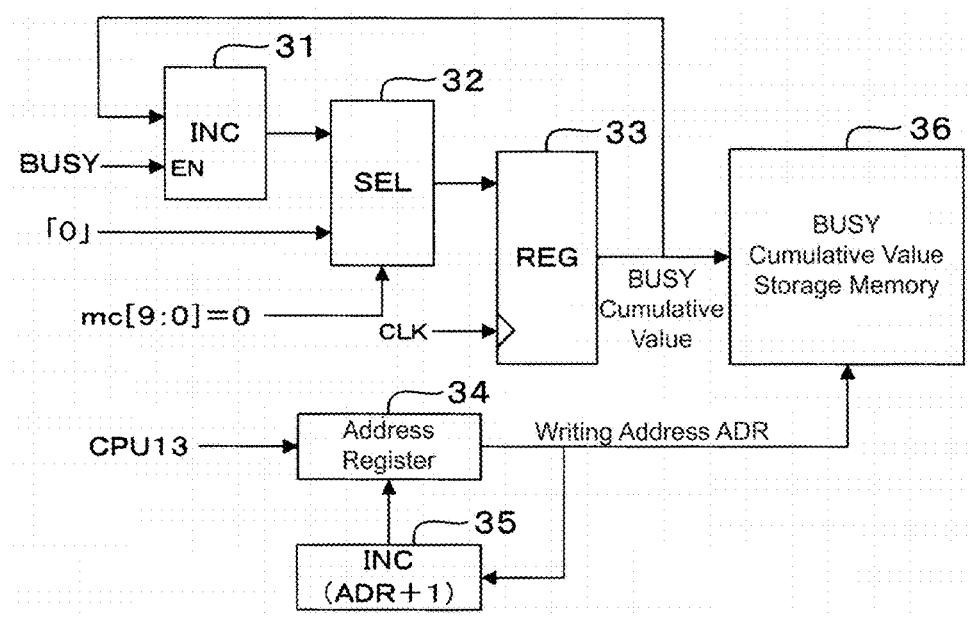
FIGS. 4A and 4B are circuit diagrams showing, respectively, a configuration of a traffic monitor 30 and a memory map showing a configuration of a BUSY cumulative value storage memory 36.
Figure 4B:
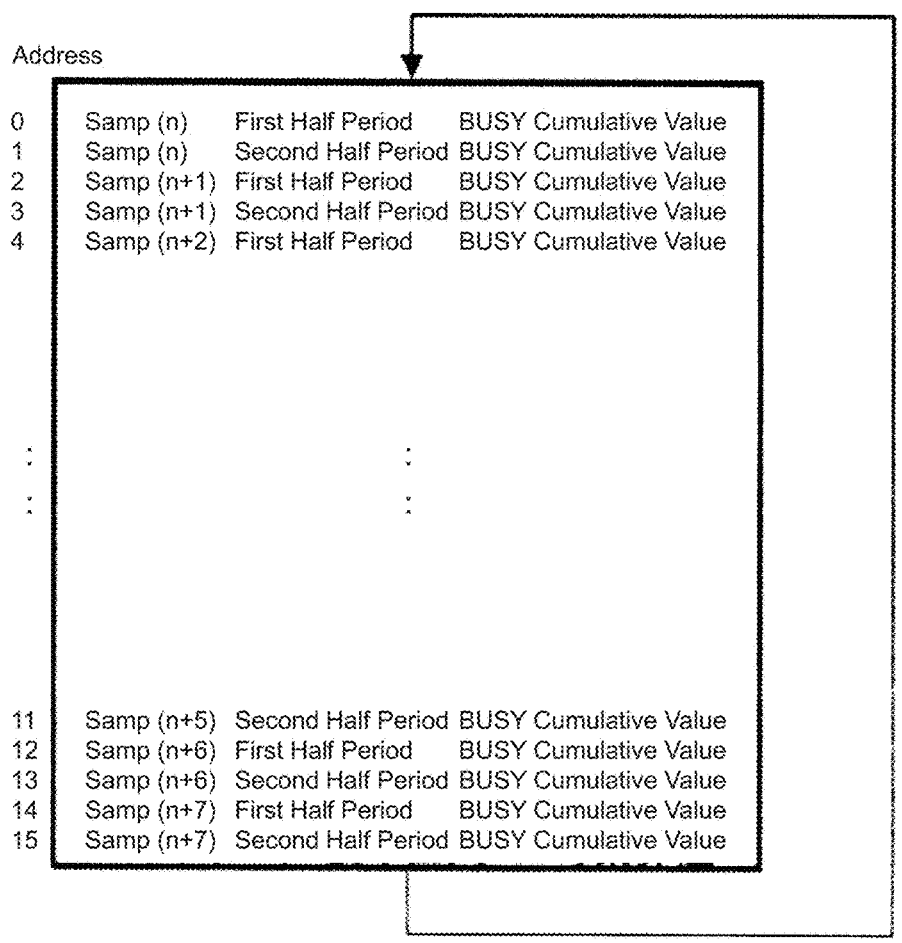

Next, the structure of the traffic monitor 30 will be explained with reference to FIGS. 4A and 4B. FIG. 4A is a circuit diagram showing the configuration of the traffic monitor 30 (waveform generating unit traffic monitor 30a, waveform processing unit traffic monitor 30b, CPU traffic monitor 30c). FIG. 4B is a memory map showing a configuration of a BUSY cumulative value storage memory 36 included in the traffic monitor 30.

The traffic monitor 30 shown in FIG. 4A is constituted by an incrementing unit 31, a selector 32, a register 33, an address register 34, an address incrementing unit 35, and the BUSY cumulative value storage memory 36. When a BUSY signal has been supplied to an enable terminal EN, the incrementing unit 31 increases the output of the register 33 by (+1) and outputs a BUSY cumulative value. It should be noted that the BUSY signal is supplied from whichever bus is being monitored.

Every time the clock signal mc <9:0> is "0," or in other words, every ½ sampling period, the selector 32 selects "0" input and resets the BUSY cumulative value to zero, and at other times, outputs the BUSY cumulative value received from the incrementing unit 31 to the next step register 33. The register 33 returns the BUSY cumulative value to the incrementing unit 31 in synchronization with the operation clock signal CLK and writes the BUSY cumulative value to the BUSY cumulative value storage memory 36 in accordance with the write address ADR generated by the address register 34 (described later). In this manner, the incrementing unit 31, the selector 32, and the register 33 calculate the BUSY cumulative value (i.e., the number of times a BUSY signal is generated) every ½ sampling period of whichever bus is being monitored.

The address register 34 and the address incrementing unit 35 generate the write address ADR, which is incremented every ½ sampling period. As shown in FIG. 4B, the BUSY cumulative value storage memory 36 functions as a cyclical memory that returns to the first address when the write address ADR has reached a prescribed value.

Figure 5:
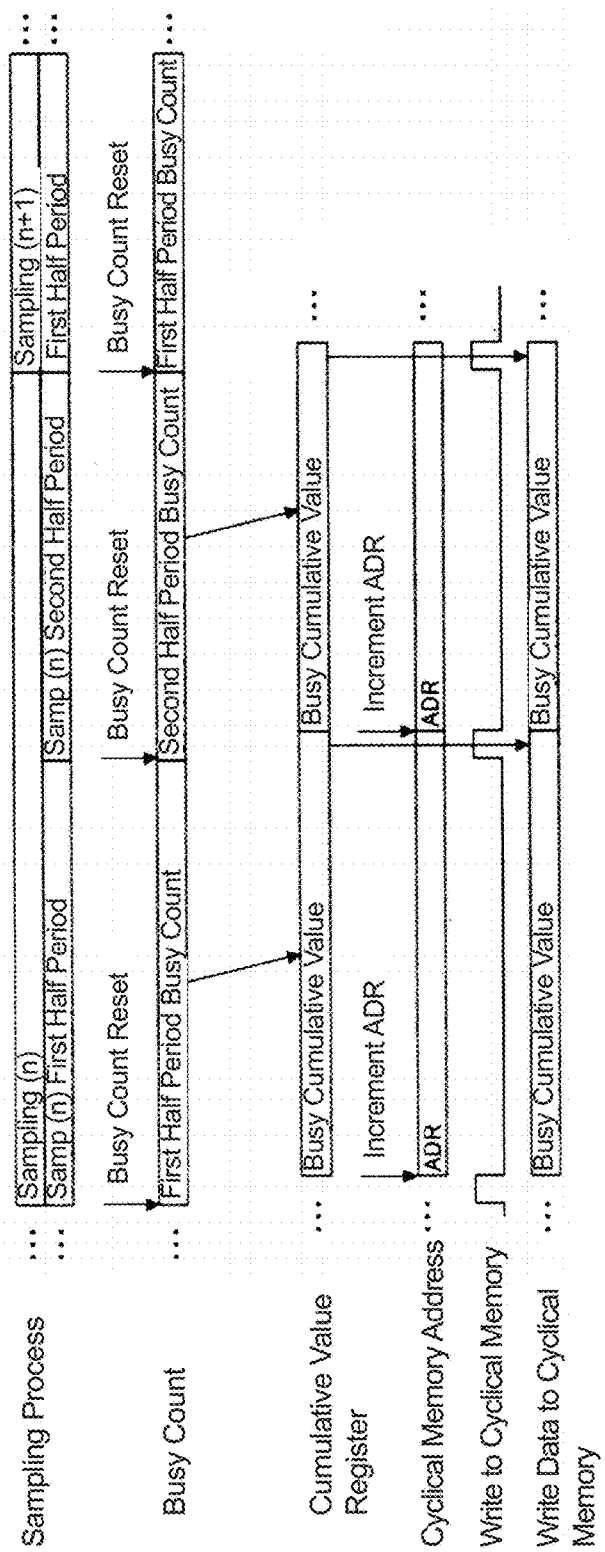
FIG. 5 is a time chart showing an example of an operation in which a BUSY cumulative value is written to the BUSY cumulative value storage memory 36 (cyclical memory) in accordance with a write address ADR.

The BUSY cumulative value of the register 33 is written to the BUSY cumulative value storage memory 36 in accordance with the write address ADR generated by the address register 34. In other words, as shown in FIG. 5, with the ½ sampling period as one period, a BUSY cumulative value in the first half of the period and a BUSY cumulative value in the second half of the period are sequentially written in one sampling period in accordance with the write address ADR, which is incremented every ½ sampling period. It should be noted that the cyclical memory shown in FIG. 5 indicates the BUSY cumulative value storage memory 36.

The CPU 13 refers to the write address ADR of the BUSY cumulative value storage memory 36 to obtain the BUSY cumulative value from the immediately preceding period (period within the ½ sampling period). This BUSY cumulative value serves as an index representing the traffic on the bus (bus load). It should be noted that the reason the BUSY cumulative value is stored in the BUSY cumulative value storage memory 36 over a plurality of periods (periods within the ½ sampling periods) is in order to calculate the average bus load from the BUSY cumulative values of a plurality of periods, in order to predict changes in bus load, or the like.

The CPU 13 optimizes the bus loads of the respective units (waveform generating unit 160, waveform processing unit 161, and CPU 13) requesting access to the shared memory 15. This optimization is performed in accordance with the BUSY cumulative values in the immediately preceding periods (periods within the ½ sampling periods) respectively read from the BUSY cumulative value storage memories 36 of the waveform generating unit traffic monitor 30a, the waveform processing unit traffic monitor 30b, and the CPU traffic monitor 30c.

Figure 6:
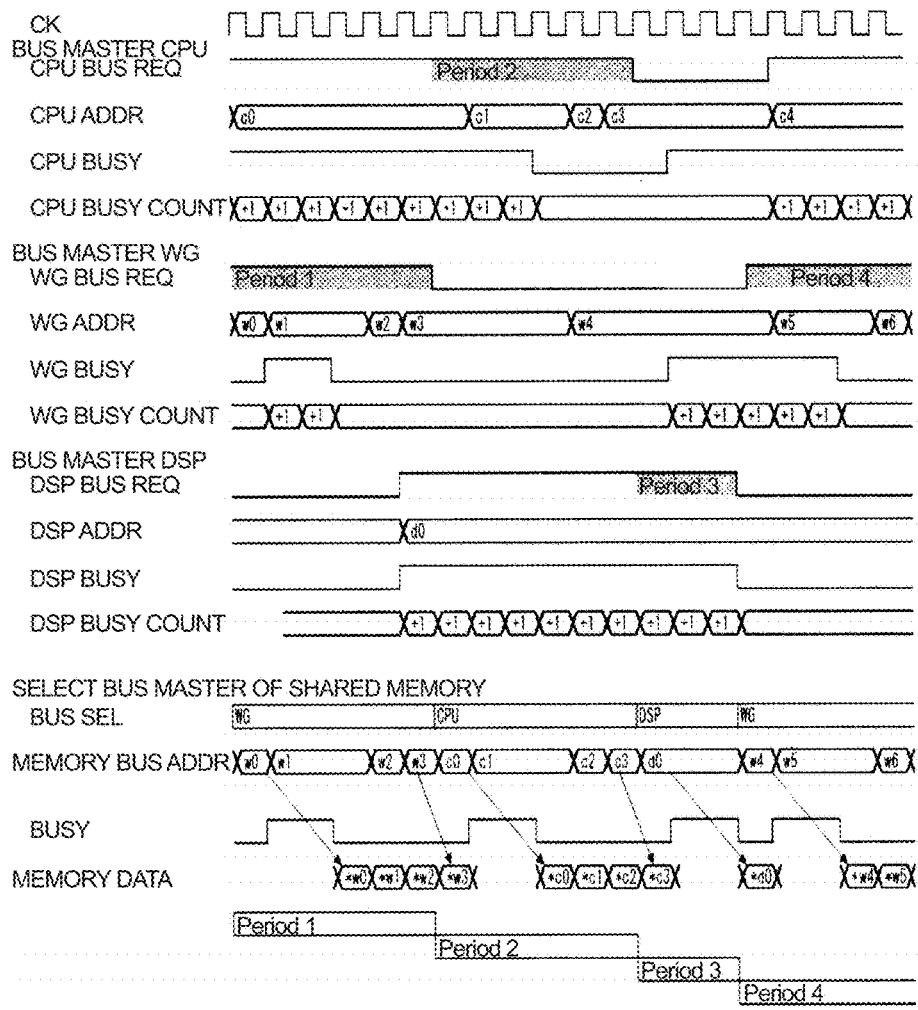
FIG. 6 is a time chart showing an example of an operation to select a bus master that accesses a shared memory 15.

An example will be described below with reference to FIG. 6 whereby a selection operation to select the bus master accesses the shared memory 15 in accordance with one example of a BUSY cumulative value operation of the respective units (waveform generating unit 160, waveform processing unit 161, CPU 13). In this operation example, the order of priority recorded in the priority setting register 50 is set as "waveform generating unit 160">"CPU 13">"waveform processing unit 161." In FIG. 6, WG represents the waveform generating unit 160 and DSP represents the waveform processing unit 161.

First, in period 1, there are simultaneous bus requests from the CPU 13 and the waveform generating unit 160 (WG) to access the shared memory 15, but because the waveform generating unit 160 (WG) has a higher priority than the CPU 13 in this case, the waveform generating unit 160 (WG) is selected as the bus master of the shared memory 15. Next, in period 2, the waveform generating unit 160 (WG) stops requesting to use the bus, but there are then simultaneous bus requests from the CPU 13 and the waveform processing unit 161 (DSP) to access the shared memory 15. Due to the CPU 13 having a higher priority than the waveform generating unit 161 (DSP), however, the CPU 13 is selected as the bus master of the shared memory 15.

Next, in period 3, the CPU 13 stops requesting to use the bus, and thus only the waveform processing unit 161 (DSP) is generating a bus request to access the shared memory 15. In this case, the waveform processing unit 161 (DSP), which has the lowest order of priority, is selected as the bus master of the shared memory 15. Next, in period 4, while the waveform processing unit 161 (DSP) is still the only unit generating a bus request to access the shared memory 15, the waveform generating unit 160 (WG) once again generates a bus request to access the shared memory 15. In this case, the waveform generating unit 160 (WG) has a higher priority than the waveform processing unit 161 (DSP), and thus the waveform generating unit 160 (WG) is selected as the bus master of the shared memory 15.

C. Operation

Next, an operation of the musical sound playing device according to one embodiment will be explained with reference to FIGS. 7 to 9. The paragraphs below describe a note event process executed by the CPU 13, a bus monitor process jointly executed by the CPU 13 and the traffic monitor 30 (waveform generating unit traffic monitor 30a, waveform processing unit traffic monitor 30b, and CPU traffic monitor 30c), and a priority modification process executed by the CPU 13.

(1) Operation of Note Event Process

Figure 7:
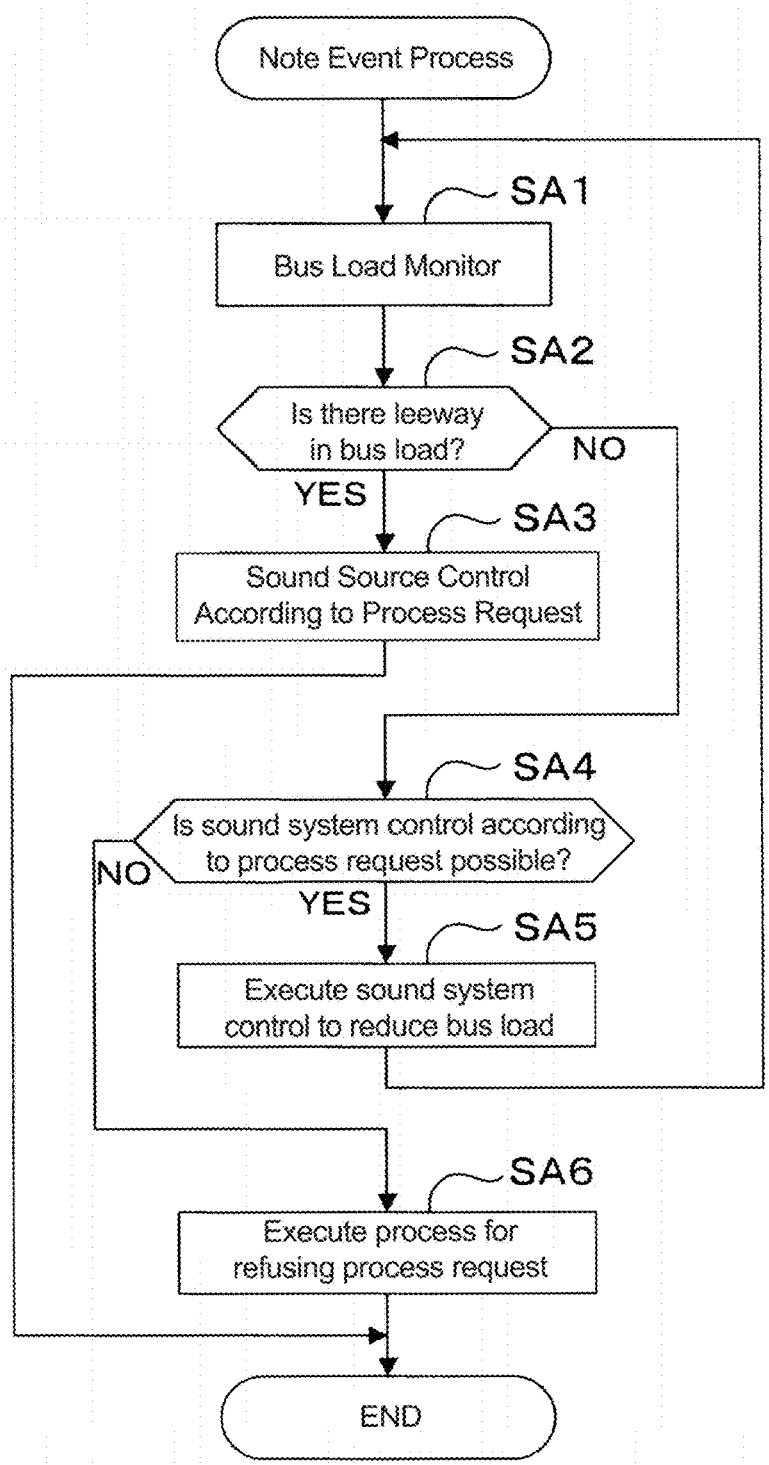
FIG. 7 is a flowchart showing an operation of a note event process executed by a CPU 13.

FIG. 7 is a flowchart showing an operation of a note event process executed by the CPU 13. The note event process is executed when a note ON/note OFF event has occurred or when a pitch bending event in which the pitch is controlled while the sound is being played has occurred. When either of these events occurs, the CPU 13 executes the main process and progresses to step SA1 shown in FIG. 7.

In step SA1, the BUSY cumulative values are respectively read from the BUSY cumulative value storage memories 36 included in the waveform generating unit traffic monitor 30a, the waveform processing unit traffic monitor 30b, and the CPU traffic monitor 30c. The BUSY cumulative values read from the BUSY cumulative value storage memories 36 of the respective monitors 30a to 30c are indices indicating the respective loads on the buses.

Next, in step SA2, it is determined how much leeway there is in accordance with the loads on the buses (BUSY cumulative values) that have been read. Specifically, it is determined whether the respective loads on the buses (BUSY cumulative values) have exceeded the upper limit recorded in the upper limit setting register 30d.

If the respective loads on the buses (BUSY cumulative values) do not exceed the upper limit recorded in the upper limit setting register 30d and there is still leeway, then the determination result of step SA2 is "YES," and the process progresses to step SA3. If the sound source control according to the process request is a note event, for example, then the note event is transmitted to the sound source 16 and the main process is ended. It should be noted that a musical sound waveform is generated in the sound source 16 (waveform generating unit 160) in accordance with the received note event.

On the other hand, if any of the loads on the buses (BUSY cumulative values) exceeds or reaches the upper limit recorded in the upper limit setting register 30d, then the determination result of step SA2 is "NO," and the process progresses to step SA4. In step SA4, it is determined whether sound source control according to the processing request is possible. If it is possible, then the determination result is "YES," and the process progresses to step SA5. In step SA5, sound control is performed to reduce the load on the buses, such as by muting the sound channels generating the most decayed musical sound waveforms in order to reduce the number of sounds. Thereafter, the process returns to step SA1 and again monitors the load status of the respective buses.

In contrast, if it is not possible for sound source control to be performed according to the process request, then the determination result of step SA4 is "NO." In such a case, the process progresses to step SA6 and then executes a process for refusing the process request, after which the main process is ended.

In this manner, in the note event process, when a note ON/note OFF event or pitch bending event occurs, the loads on the respective buses (BUSY cumulative values) accessing the shared memory 15 are monitored. If there is leeway in the loads on the buses, then sound source control according to the requested event is executed, but if there is no leeway, or in other words, if any of the loads on the buses (BUSY cumulative values) exceeds or reaches the upper limit recorded in the upper limit setting register 30d, then the bus load is reduced by, for example, muting the sound channels generating the most decayed musical sound waveforms in order to reduce the number of sounds. Thus, it is possible to avoid a decrease in processing performance for controlling the entire system (entire musical instrument).

(2) Operation of Bus Monitor Process

Figure 8:
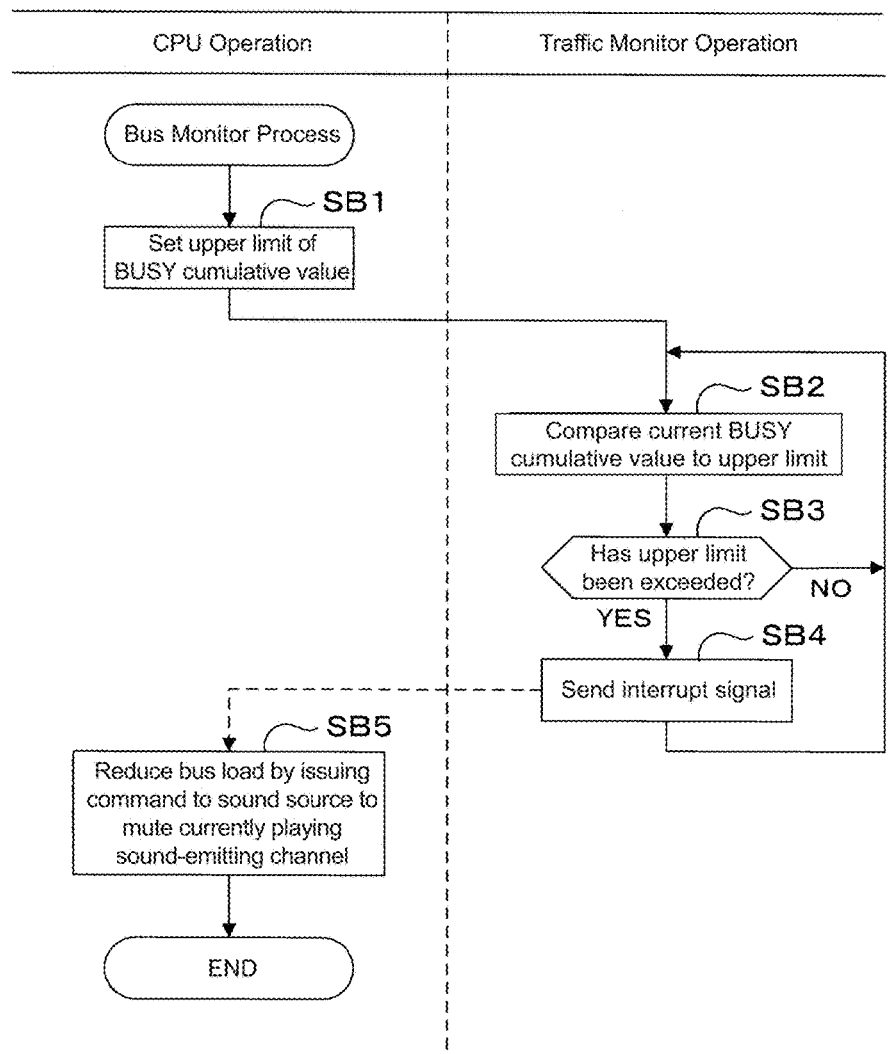
FIG. 8 is a flowchart showing a bus monitor process jointly executed by the CPU 13 and the traffic monitor 30 (waveform generating unit traffic monitor 30a, waveform processing unit traffic monitor 30b, and CPU traffic monitor 30c).

FIG. 8 is a flowchart showing an operation of a bus monitor process. The main process is jointly executed by the CPU 13 and the traffic monitor 30 (waveform generating unit traffic monitor 30a, waveform processing unit traffic monitor 30b, and CPU traffic monitor 30c).

First, in step SB1, the CPU 13 records the upper limits of the respective bus loads (BUSY cumulative values) in the upper limit setting register 30d (see FIG. 3). Thereafter, steps SB2 to SB3 serve as operations of the traffic monitor 30 (waveform generating unit traffic monitor 30a, waveform processing unit traffic monitor 30b, and CPU traffic monitor 30c).

In step SB2, the current BUSY cumulative value written to the BUSY cumulative value storage memory 36 (see FIG. 4B) is compared to the upper limit of the upper limit setting register 30d, and in the following step SB3, it is determined whether the current BUSY cumulative value has exceeded the upper limit. If the current BUSY cumulative value has not exceeded the upper limit of the upper limit setting register 30d, then the determination result of step SB3 is "NO," the process returns to step SB2, and comparison between the BUSY cumulative value and the upper limit continues. In contrast, if the current BUSY cumulative value has exceeded the upper limit of the upper limit setting register 30d, then the determination result of step SB3 is "YES," the process progresses to step SB4, and an interrupt signal is generated and transmitted to the CPU 13. Thereafter, the process returns to step SB2.

Next, the CPU 13 receives the interrupt signal from the traffic monitor 30 and executes step SB5. In step SB5, sound source control for reducing the bus load is executed by, for example, muting the sound channels generating the most decayed musical sound waveforms in order to reduce the number of sounds, after which the main process is ended.

In this manner, during the bus monitoring process jointly executed by the CPU 13 and the traffic monitor 30, the upper limit of the load on the respective buses (BUSY cumulative value) is recorded in the upper limit setting register 30d (see FIG. 3). The traffic monitor 30 compares the BUSY cumulative values, which change over time, of the respective buses to these upper limits, and if the BUSY cumulative value exceeds or reaches the upper limit, an interrupt signal is transmitted to the CPU 13. In response to the interrupt signal, the CPU 13 reduces the bus load by, for example, muting the sound channels generating the most decayed musical sound waveforms in order to reduce the number of sounds, after which the main process is ended. Thus, it is possible to avoid a decrease in processing performance in controlling the entire system (entire musical instrument).

(3) Operation of Priority Modification Process

Figure 9:
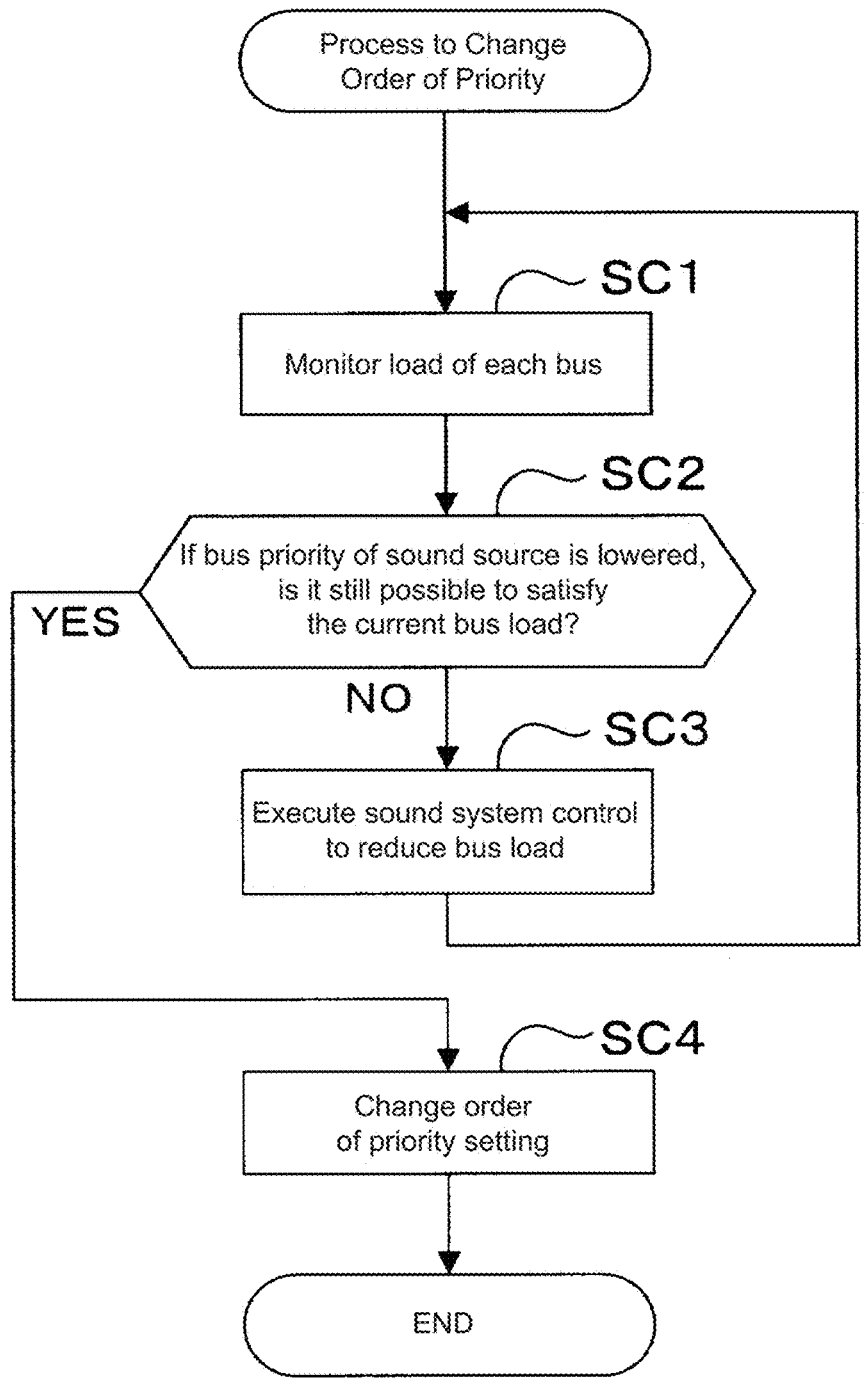
FIG. 9 is a flowchart showing an operation of a priority modification process executed by the CPU 13.

FIG. 9 is a flowchart showing an operation of a priority modification process executed by the CPU 13. The main process is executed every prescribed number of periods as an interrupting process. When the execution timing arrives, the CPU 13 progresses to step SC1 shown in FIG. 9, and reads the respective BUSY cumulative values from the BUSY cumulative value storage memories 36 included in the waveform generating unit traffic monitor 30a, the waveform processing unit traffic monitor 30b, and the CPU traffic monitor 30c. The respective BUSY cumulative values read from the BUSY cumulative value storage memories 36 included in the monitors 30a to 30c are indices indicating the loads on the respective buses.

Next, in step SC2, when the bus priority order of the sound source 16 (wave generating unit 160) is lowered, it is determined whether it is possible to satisfy the current bus load of the waveform generating unit 160. If it is possible, then the determination result is "YES," the process progresses to step SC4, and the priority order recorded in the priority setting register 50 (see FIG. 3) is modified.

Specifically, the priority of the waveform generating unit 160 is lowered while whichever of the CPU 13 and the waveform processing unit 161 having a higher bus load than the waveform generating unit 160 is prioritized. In this manner, the arbiter 40 allows the bus master with the largest bus load to have priority in accessing the shared memory 15.

On the other hand, if the bus priority order of the sound source 16 (waveform generating unit 160) is lowered and it is not possible to satisfy the current bus load of the waveform generating unit 160, then the determination result of step SC2 is "NO," and the process progresses to step SC3. In step SC3, sound source control for reducing the bus load is executed by, for example, muting the sound channels generating the most decayed musical sound waveforms in order to reduce the number of sounds. Thereafter, the process returns to step SC1.

In this manner, in the priority modification process, if an increase in the processing load of the CPU 13 makes it necessary to lower the bus priority order of the sound source 16 (waveform generating unit 160) accessing the shared memory 15 but the current bus load cannot be maintained by lowering the bus priority order of the waveform generating unit 160, then the bus load is instead reduced by, for example, muting the sound channels generating the most decayed musical sound waveforms in order to reduce the number of sounds. Thus, it is possible to avoid a decrease in performance in controlling the entire system (entire musical instrument).

D. Modification Example

Figure 10:
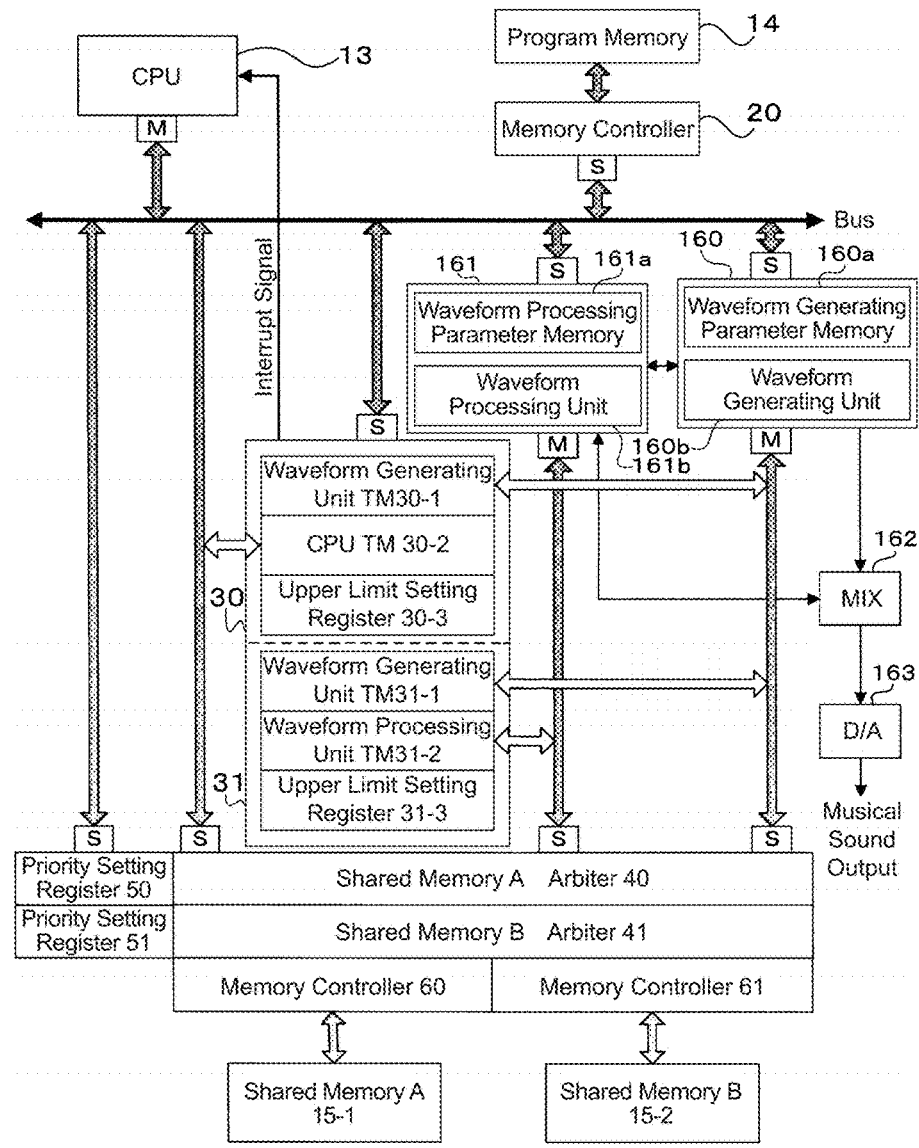
FIG. 10 is a block diagram showing a configuration of a musical sound playing device according to a modification example.

Next, a modification example of the above embodiment will be described with reference to FIG. 10. FIG. 10 is a block diagram showing a configuration of a musical sound playing device according to a modification example. In this drawing, components in common with the respective parts shown in FIG. 3 are assigned the same reference characters, and descriptions thereof are omitted.

The modification example shown in FIG. 10 differs from the musical sound playing device shown in FIG. 3 in the following respects:

(a) two separate shared memories are provided: a shared memory A 15-1 and a shared memory B 15-2;

(b) because of (a), a traffic memory 30, an arbiter 40, a priority setting register 50, and a memory controller 60 connected to the shared memory A; and a traffic memory 31, an arbiter 41, a priority setting register 51, and a memory controller 61 connected to the shared memory B are provided;

(c) the waveform generating unit 160 can access both the shared memory A 15-1 and the shared memory B 15-2; and (d) the CPU 13 can access the shared memory A 15-1 and the waveform processing unit 161 can access the shared memory B 15-2.

According to this configuration, by providing two shared memories, it is possible to distribute the loads on the respective buses, which reduces the BUSY cumulative values and the transmission standby time, thereby enabling, to an even greater degree, the avoidance of a decrease in processing performance in controlling the entire system (entire musical instrument).

As described above, in the present embodiment, the musical sound playing device includes: a CPU 13 that controls respective units of a device in accordance with data items read from the shared memory 15; and a sound source 16 that generates a sound in accordance with the data items read from the shared memory 15 under control of the CPU 13. The musical sound playing device is further provided with a traffic monitor 30 that monitors the load status of respective buses of the CPU 13 and sound source 16 accessing the shared memory 15. In response to the load status of the respective buses monitored by this traffic monitor 30, the CPU 13 causes the sound source 16 to lower the bus load, or changes the priority order of the respective units constituting the sound source 16 accessing the shared memory 15. This makes it is possible to avoid a decrease in processing performance in controlling the entire system (entire musical instrument).

The embodiment of the present invention was described above, but the present invention is not limited thereto, and encompasses the present invention stated in the claims of the present application and their equivalents.

It will be apparent to those skilled in the art that various modification and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A processing device, comprising:
a plurality of processing units that perform processes in accordance with data items read from a memory;
a bus that connects the memory to the plurality of processing units;
a bus arbiter that arbitrates access to the memory by the plurality of processing units in accordance with an order of priority of access rights for the respective plurality of processing units when access requests to the memory from the plurality of processing units overlap with each other;
a traffic monitor that monitors traffic on the bus with respect to the plurality of processing units,
wherein the plurality of processing units include a musical sound generator that generates a musical sound waveform in accordance with data items read from the memory, a waveform processor that processes the musical sound waveform, and a central processor that controls the musical sound generator in accordance with data items read from the memory,
wherein the bus arbiter comprises a priority setting register that sets the order of priority of access rights for the respective plurality of processing units and that can be modified by the central processor to change the order of priority of access rights,
wherein the central processor initially sets the priority setting register such that the highest priority of access rights is initially assigned to the musical sound generator; and
wherein the central processor performs a note event process in response to a user operation affecting a musical note, the note event process including, when the traffic on the bus monitored by the traffic monitor exceeds or reaches a prescribed upper limit, reducing or suspending the traffic of the musical sound generator without changing the order of priority assigned by the priority setting register.

2. The processing device according to claim 1,
wherein the bus arbiter controls the bus such that, when one of the processing units requests the access rights to the memory while another one of the processing units has already been given the access rights to the memory, the bus arbiter decides whether to remove the access rights from said another one of the processing units and give the access rights to said one of the processing units that is requesting the access rights in accordance with the order of priority set by the priority setting register.

3. The processing device according to claim 1,
wherein said central processor further performs a priority changing process in which the central processor determines whether a current bus load of the musical sound generator can be satisfied if the priority of the musical sound generator is lowered, and if said central processor determines that the current bus load of the musical sound generator can be satisfied, said central processor lowers the priority of the musical sound generator in the priority setting register, and if said central processor determines that the current bus load of the musical sound generator cannot be satisfied if the priority of the musical sound generator is lowered, said central processor performs a process that causes a reduction of access requests of the musical sound generator to the memory.

4. The processing device according to claim 3,
wherein when performing said process that causes the reduction of access requests of the musical sound generator to the memory in the priority changing process, the central processor reduces a number of musical sounds being simultaneously emitted in the musical sound waveform generated by the musical sound generator.

5. The processing device according to claim 3,
wherein when performing said process that causes the reduction of access requests of the musical sound generator to the memory in the priority changing process, the central processor mutes a sound channel that is most decayed among a plurality of sound channels in the musical sound waveform.

6. The processing device according to claim 1,
wherein the traffic monitor has an upper limit setting register that sets the prescribed upper limit for the traffic of the respective plurality of processing units.

7. The processing device according to claim 1,
wherein said order of priority of the access rights initially is, from the higher order to the lower order, in the order of: the musical sound generator, the central processor, and the waveform processor.

8. The processing device according to claim 1,
wherein, when the traffic for the musical sound generator exceeds or reaches the prescribed upper limit, the traffic monitor outputs to the central processor a control signal to control the musical sound generator, and
wherein the central processor controls the musical sound generator so as to reduce the traffic therefor in response to said control signal.

9. The processing device according to claim 8, wherein, in response to input of the control signal, the central processor controls the musical sound generator so as to reduce a number of musical sounds being simultaneously emitted.

10. An electronic musical instrument, comprising:
the processing device according to claim 1; and
an operating element that sets a pitch of a musical sound to be played,
wherein the central processor controls the musical sound generator and the waveform processor so as to generate the musical sound of the pitch set in the operating element.

11. The processing device according to claim 1,
wherein when performing said reduction of the traffic of the musical sound generator, the central processor reduces a number of musical sounds being simultaneously emitted in the musical sound waveform generated by the musical sound generator.

12. The processing device according to claim 1,
wherein when performing said reduction of the traffic of the musical sound generator, the central processor mutes a sound channel that is most decayed among a plurality of sound channels in the musical sound waveform.

13. A processing method performed by a processing device having a plurality of processing units that perform processes in accordance with data items read from a memory, and a bus connecting the memory to the plurality of processing units, the method comprising:
arbitrating access to the memory by the plurality of processing units in accordance with an order of priority of access rights for the respective plurality of processing units when access requests to the memory from the plurality of processing units overlap with each other; and
monitoring traffic on the bus with respect to the plurality of processing units,
wherein the plurality of processing units include a musical sound generator that generates a musical sound waveform in accordance with data items read from the memory, a waveform processor that processes the musical sound waveform, and a central processor that controls the musical sound generator in accordance with data items read from the memory,
wherein the arbitering is performed by a bus arbiter that comprises a priority setting register that sets the order of priority of access rights for the respective plurality of processing units and that can be modified by the central processor to change the order of priority of access rights,
wherein the method further comprises:
causing the central processor to initially set the priority setting register such that the highest priority of access rights is initially assigned to the musical sound generator; and
causing the central processor to perform a note event process in response to a user operation affecting a musical note, the note event process including, when the traffic on the bus monitored by the traffic monitor exceeds or reaches a prescribed upper limit, reducing or suspending the traffic of the musical sound generator without changing the order of priority assigned by the priority setting register.

14. A non-transitory computer-readable storage medium having stored therein instructions executable by a processing device, said processing device including a plurality of processing units that perform processes in accordance with data items read from a memory, and a bus connecting the memory to the plurality of processing units, the instructions causing the processing device to execute the following:
arbitrating access to the memory by the plurality of processing units in accordance with an order of priority of access rights for the respective plurality of processing units when access requests to the memory from the plurality of processing units overlap with each other; and
monitoring traffic on the bus with respect to the plurality of processing units,
wherein the plurality of processing units include a musical sound generator that generates a musical sound waveform in accordance with data items read from the memory, a waveform processor that processes the musical sound waveform, and a central processor that controls the musical sound generator in accordance with data items read from the memory,
wherein the arbitering is performed by a bus arbiter that comprises a priority setting register that sets the order of priority of access rights for the respective plurality of processing units and that can be modified by the central processor to change the order of priority of access rights,
wherein the instructions further causing the processing device to execute the following:
causing the central processor to initially set the priority setting register such that the highest priority of access rights is initially assigned to the musical sound generator; and
causing the central processor to perform a note event process in response to a user operation affecting a musical note, the note event process including, when the traffic on the bus monitored by the traffic monitor exceeds or reaches a prescribed upper limit, reducing or suspending the traffic of the musical sound generator without changing the order of priority assigned by the priority setting register.

15. A processing device, comprising:
a plurality of processing units that perform processes in accordance with data items read from a memory;
a bus that connects the memory to the plurality of processing units;
a bus arbiter that arbitrates access to the memory by the plurality of processing units in accordance with an order of priority of access rights for the respective plurality of processing units when access requests to the memory from the plurality of processing units overlap with each other;

a traffic monitor that monitors traffic on the bus with respect to the plurality of processing units, wherein the plurality of processing units include a musical sound generator that generates a musical sound waveform in accordance with data items read from the memory, a waveform processor that processes the musical sound waveform, and a central processor that controls the musical sound generator in accordance with data items read from the memory, wherein the bus arbiter comprises a priority setting register that sets the order of priority of access rights for the respective plurality of processing units and that assigns the highest priority of access rights to the musical sound generator among the plurality of processing units, and wherein when the traffic on the bus monitored by the traffic monitor exceeds or reaches a prescribed upper limit, the central processor reduces or suspends the traffic of the musical sound generator without changing the order of priority assigned by the priority setting register.

16. The processing device according to claim 15,
wherein when performing said reduction of the traffic of the musical sound generator, the central processor reduces a number of musical sounds being simultaneously emitted in the musical sound waveform generated by the musical sound generator.

17. The processing device according to claim 15,
wherein when performing said reduction of the traffic of the musical sound generator, the central processor mutes a sound channel that is most decayed among a plurality of sound channels in the musical sound waveform.

* * * * *